United States Patent
Romanuk et al.

[15] 3,674,819
[45] July 4, 1972

[54] PROCESS OF PREPARING ESTERS OF 3,7,11-TRIMETHYL-7,11-DICHLORO-2-DODECENE-1-OIC ACID

[72] Inventors: Miroslav Romanuk; Karel Slama; Frantisek Sorm, all of Prague, Czechoslovakia

[73] Assignee: Ceskoslovenska Akademie Ved, Prague, Czechoslovakia

[22] Filed: April 30, 1969

[21] Appl. No.: 820,637

[30] Foreign Application Priority Data

May 3, 1968 Czechoslovakia ..................... 3268/68

[52] U.S. Cl. ............................................. 260/408, 424/318
[51] Int. Cl. ........................................................... C11c 3/00
[58] Field of Search ................................................. 260/408

[56] References Cited

UNITED STATES PATENTS 3,154,570   10/1964   Adami et al. ........................... 260/408

OTHER PUBLICATIONS

Law et al., " Synthesis of a Material with High Juvenile Hormone Activity" Proceedings of the National Academy of Sciences. Vol. 55, No. 3, pp. 576 March 1966
Romanuk et al. " Constitution of a Compound with a Pronounced Juvenile Hormone Activity" Proc. Natl. Acad. Sci. Vol. 57 No. 2 pp. 349– 352 (1967)

*Primary Examiner*—Lewis Gotts
*Assistant Examiner*—Catherine L. Mills
*Attorney*—Michael S. Striker

[57] ABSTRACT

Process for the preparation of esters of 3,7,11-trimethyl-7,11-dichloro-2-dodecene-1-oic acid having the formula

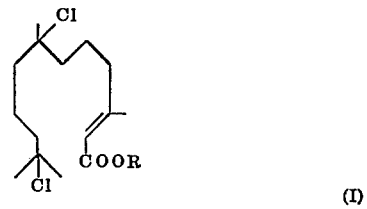

(I)

wherein R is alkyl, cycloalkyl, aryl or aralkyl which comprises reacting farnesylic acid with hydrogen chloride in the presence of acetic acid to thereby form 3,7,11-trimethyl-7,11-dichloro-2-dodecene-1-oic acid having the formula

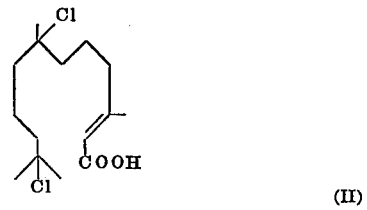

(II)

reacting said 3,7,11-trimethyl-7,11-dichloro-2-dodecene-1-oic acid with a chlorination agent to thereby form the corresponding chloride and converting the chloride to the ester by reaction with an alcohol for producing the desired ester.

The 3,7,11-trimethyl-7,11-dichloro-2-dodecene-1-oic acid is novel.

The esters can be employed to prevent the maturation of insects, i.e., larvae so treated do not attain adulthood.

1 Claim, No Drawings

PROCESS OF PREPARING ESTERS OF 3,7,11-TRIMETHYL-7,11-DICHLORO-2-DODECENE-1-OIC ACID

The invention relates to a process of preparing esters of 3,7,11-trimethyl-7,11-dichloro-2-dodecene-1-oic acid.

Compounds related by their chemical structure to the sesquiterpenic alcohol farnesol show a strong juvenilization activity with respect to some insect species. That is, such compounds can be utilized for regulating their larval growth and reproduction.

A very high degree of activity of the above-mentioned type is evidenced by esters of 3,7,11-trimethyl-7,11-dichloro-2-dodecene-1-oic acid of the formula I

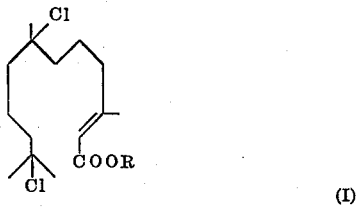

wherein R designates alkyl, cycloalkyl, aryl, or aralkyl.

According to the U.S. Pat. application No. 646,204/67, the latter compounds have been prepared by introduction of gaseous hydrogen chloride into a solution of the corresponding farnesylate in a suitable organic solvent. The disadvantage of this procedure lies in the unavailability of some of the farnesylates to reaction, e.g., because of sterical hindrance in some alcohols or a relatively low stability of farnesylic acid in acidic media the desired reaction does not occur.

The aforementioned disadvantages are avoided by the present invention which provides a process of preparing esters of 3,7,11-trimethyl-7,11-dichloro-2-dodecene-1-oic acid of the formula

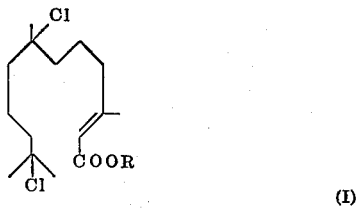

wherein R designates alkyl, cycloalkyl, aryl, or aralkyl comprising reacting farnesylic acid with hydrogen chloride, preferably under cooling in the presence of acetic acid, under the formation of 3,7,11-trimethyl-7,11-dichloro-2-dodecene-1-oic acid of the formula

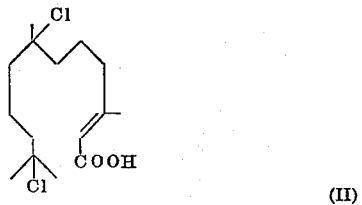

treating the latter acid with a chlorination agent such as phosphorus pentachloride or phosphorus trichloride or, preferably, thionyl chloride, under the formation of the chloride of the dichloro acid II, removing the excess chlorinating agent, e.g., thionyl chloride by distillation, converting the chloride of the dichloro acid II by reaction thereof with an alcohol to the corresponding ester, and isolating the ester thereby formed in the conventional manner.

According to the present invention, the active ester represented by the general formula I is prepared via the hitherto unknown 3,7,11-trimethyl-7,11-dichloro-2-dodecene-1-oic acid (Formula II). The latter acid II is obtained advantageously by the action of hydrogen chloride on farnesylic acid in the presence of acetic acid. The resulting crystalline dichloro acid (Formula II) is converted into its chloride by the action of the usual chlorination agents, preferably thionyl chloride, the excess of which is then removed by distillation. The crude chloride of the dichloro acid II very readily and in satisfactory yields provides the esters according to the formula I. In contrast to farnesylic acid, the bis-hydrochlorinated farnesylic acid derivative (Formula II) lacks two double bonds and reacts with thionyl chloride or analogous reagents without formation of a perceptible amount of by-products.

The invention is further illustrated by the following examples which are not to be construed in any way as being limitative thereof.

In Example 2 the preparation of methyl 3,7,11-trimethyl-7,11-dichloro-2-dodecene-1-oate (Formula I, R=CH$_3$) is set out together with data on the comparison of its activity with that of the same compound which had, however, been prepared according to the method of U.S. Pat. application No. 646,204.

In Example 3, the preparation of tert-butyl 3,7,11-trimethyl-7,11-dichloro-2-dodecene-1-oate (Formula I, R = tert—C$_4$H$_9$) id described. As compared to the known procedures, that of the invention is less troublesome and leads to very high yields.

EXAMPLE I 3,7,11-Trimethyl-7,11-dichloro-2-dodecene-1-oic Acid (Formula II)

A solution of farnesylic acid (2.0 g) in glacial acetic acid (40 ml) was saturated at 0°–10° C by introduction of gaseous hydrogen chloride therein. The procedure took about 10–15 minutes. Acetic acid and hydrogen chloride were removed by distillation under diminished pressure (15–40 torr). The residue gradually solidified to a crystalline mass. A single crystallization from petroleum ether (b.p.40°–60° C) produced 1.42 g of white prisms of 3,7,11-trimethyl-7,11-dichloro-2-dodecene-1-oic acid (Formula II), m.p. 92°–93° C. For C$_{15}$H$_{26}$O$_2$Cl$_2$ (309.3) calculated: 58.26 percent C, 8.47 percent H, 22.93 percent Cl; found: 58.16 percent C, 8.50 percent H, 22.63 percent Cl. Main frequencies in infrared spectrum: 1,644 cm$^{-1}$ 1,696 cm$^{-1}$, and a diffuse band at 2,400–3,400 cm$^{-1}$. Nuclear magnetic resonance spectrum (Varian 100 Mc): C = CH 5.70 p.p.m., 1H; trans-HC = CCH$_3$ 2.17 p.p.m., J≈1.25 c.p.s., doublet 3H; —C(CH$_3$)$_2$Cl singlet, 1.58 p.p.m., 6H.

EXAMPLE II

Methyl 3,7,11-trimethyl-7,11-dichloro-2-dodecene-1-oate (Formula I, R = CH$_3$)

Thionyl chloride (1,000 mg) was added under stirring at room temperature to 3,7,11-trimethyl-7,11-dichloro-2-dodecene-1-oic acid (500 mg; Formula II) and the resulting mixture heated under stirring and exclusion of atmospheric moisture for 10 minutes at 50°–70° C. The excess thionyl chloride was removed by distillation under diminished pressure (20°–50° C at 20–50 torr). Anhydrous methanol (one or more equivalents) was then added to the residue and the resulting mixture heated under exclusion of atmospheric moisture at 50°–70° C for 10–15 minutes. The excess methanol was evaporated at 20°–50° C/20–50 torr. The residual colorless viscous liquid,i.e., methyl 3,7,11-trimethyl-7,11-dichloro-2-dodecene-1-oate (Formula I, R = CH$_3$) was of satisfactory purity; yield, 500–520 mg. For C$_{16}$H$_{28}$O$_2$Cl$_2$ (323.3) calculated: 21.94 percent Cl; found: 22.06 percent Cl. Infrared spectrum: 1,150, 1,645, and 1,710 cm$^{-1}$. Nuclear magnetic resonance spectrum: C—CH 5.66 p.p.m., 1H; trans-HC = CCH$_3$ 2.14 p.p.m., doublte J — 1.2 c.p.s.; —C(CH$_3$)$_2$Cl singlet, 1.57 p.p.m., 6H; —C(CH$_3$)Cl 1.52 p.p.m., 3H.

EXAMPLE III

Tert-Butyl 3,7,11-trimethyl-7,11-dichloro-2-dodecene-1-oate (Formula I, R = tert-C$_4$H$_9$).

Thionyl chloride (1,000 mg) was added under stirring at room temperature to 3,7,11-trimethyl-7,11-dichloro-2-dodecene-1-oic acid (500 mg; Formula II) and the mixture heated under exclusion of atmospheric moisture at 50°–70° C for 10 minutes. The excess thionyl chloride was evaporated off at 20°–50° C/20–50 torr. The residue was treated with anhydrous tert-butyl alcohol (one or more equivalents), and the mixture then heated under exclusion of atmospheric moisture at 50°–70° C for 10–15 minutes. The excess tert-butyl alcohol was evaporated off at 20°–50° C/20–50 torr. The residual clear colorless liquid represented an almost pure tert-butyl 3,7,11-trimethyl-7,11-dichloro-2-dodecene-1-oate (Formula I, R = tert-$C_4H_9$). Yield, 500–550 mg. For $C_{19}H_{34}O_2Cl_2$ (365.4) calculated: 62.45 percent C, 9.38 percent H, 19.41 percent Cl; found: 62.50 percent C, 9.38 percent H, 20.13 percent Cl. Infrared spectrum: 1140, 1645, and 1695 $cm^{-1}$.

The activity of the juvenile hormone was tested in topical test procedures on freshly molted last instars of Pyrrhocoris apterus and Dysdercus cingulatus larvae (1 μl drop of an acetone solution of the substance being tested was applied to the surface of the insect body). The activity was evaluated on the basis of the degree of preservation of the epidermal structure. Zero (0) activity designates a change of the larva to a perfect adult insect; activity 5 designates a change of the larva to an abnormal perfect extra larva instead of an adult insect, i.e., a full activity with the use of the dosage stated. Degrees 1–4 designate anomalous intermediary forms between the larval and adult form of the insect corresponding to the dosage stated. The results are shown in the following table:

TABLE

Activity of Juvenile Hormones in Topical Tests on PYRRHOCORIS APTERUS and DYSDERCUS CINGULATUS

| Compound | | doses in micrograms per individual insect | | | | | |
|---|---|---|---|---|---|---|---|
| | | 0.001 | 0.01 | 0.1 | 1.0 | 10 | 100 μg |
| Acid (Formula II) | pyrrhocoris | 0 | 0 | 0 | 3 | 5 | 5 |
| | dysdercus | 0 | 0 | 0 | 3 | 5 | 5 |
| Methyl Ester (Formula I, R = $CH_3$) | pyrrhocoris | 3 | 5 | 5 | 5 | 5 | 5 |
| | dysdercus | 1 | 4 | 5 | 5 | 5 | 5 |
| tert-Butyl Ester (Formula I, R = tert-$C_4H_9$) | pyrrhocoris | 0 | 0 | 3 | 5 | 5 | 5 |
| | dysdercus | 0 | 1 | 5 | 5 | 5 | 5 |

Other alkyl esters, such as ethyl, n-propyl, i-propyl, pentyl, hexyl etc. esters, higher alkyl esters such as nonyl, decyl and the like, aralkyl esters such as benzyl or aryl esters such as phenyl and tolyl can be prepared analogously to the above-mentioned methyl ester and tert-butyl ester.

The advantage of the novel procedure consists in the considerably higher degree of purity and the higher yields of esters the preparation of which by the known procedures was possible only in low yields and with a low degree of purity or was quite impossible.

Substances which may be prepared according to the present invention are not deleterious to plants or warm-blooded animals and show a high specificity to insects, particularly some species harmful to agriculture. By the action of these compounds, the larvae never attain the adult stage and the insect is therefore incapable of reproduction. Compounds which are prepared according to the invention, can be used also as ovicides or chemosterilants.

We claim:

1. The acid chloride of 3,7,11-trimethyl-7,11-dichloro-2-dodecene-1-oic acid.

* * * * *